US008943397B2

(12) United States Patent
Palleschi et al.

(10) Patent No.: US 8,943,397 B2
(45) Date of Patent: Jan. 27, 2015

(54) CONFIGURABLE COLUMN DISPLAY OF INFORMATION AT A WEB CLIENT

(75) Inventors: Giancarlo Palleschi, Highland, NY (US); Prasannakumar Parigivenkata, Morganville, NJ (US)

(73) Assignee: International Business Machines Corporation, Armonk, NY (US)

(*) Notice: Subject to any disclaimer, the term of this patent is extended or adjusted under 35 U.S.C. 154(b) by 2535 days.

(21) Appl. No.: 11/549,298

(22) Filed: Oct. 13, 2006

(65) Prior Publication Data

US 2008/0092033 A1 Apr. 17, 2008

(51) Int. Cl.
G06F 17/00 (2006.01)
G06F 17/30 (2006.01)
G06F 17/24 (2006.01)

(52) U.S. Cl.
CPC ........ G06F 17/247 (2013.01); G06F 17/30554 (2013.01); G06F 17/30418 (2013.01)
USPC .......................................... 715/227; 715/212

(58) Field of Classification Search
CPC .................................................. G06F 17/245
USPC ............................ 715/227, 212, 255; 707/102
See application file for complete search history.

(56) References Cited

U.S. PATENT DOCUMENTS

| | | | |
|---|---|---|---|
| 5,414,809 A * | 5/1995 | Hogan et al. .................. 715/765 |
| 5,787,411 A | 7/1998 | Groff et al. | |
| 6,134,564 A | 10/2000 | Listou | |
| 6,233,583 B1 | 5/2001 | Hoth | |
| 6,587,857 B1 * | 7/2003 | Carothers et al. .............. 707/102 |
| 6,738,770 B2 | 5/2004 | Gorman | |
| 6,839,878 B1 | 1/2005 | Icken et al. | |
| 6,978,273 B1 | 12/2005 | Bonneau et al. | |
| 6,988,241 B1 * | 1/2006 | Guttman et al. ............... 715/220 |
| 7,188,100 B2 * | 3/2007 | De Bellis et al. .................. 707/3 |
| 2004/0143564 A1 * | 7/2004 | Gross et al. ........................ 707/1 |
| 2004/0243929 A1 * | 12/2004 | Jones et al. .................... 715/509 |
| 2004/0249650 A1 * | 12/2004 | Freedman et al. ................. 705/1 |
| 2005/0015379 A1 | 1/2005 | Aureglia et al. | |
| 2005/0091224 A1 * | 4/2005 | Fisher et al. ................... 707/100 |
| 2005/0172226 A1 * | 8/2005 | Kobashi et al. ................ 715/518 |
| 2006/0001666 A1 * | 1/2006 | Cake et al. ..................... 345/440 |
| 2006/0015806 A1 * | 1/2006 | Wallace ......................... 715/503 |
| 2006/0167853 A1 * | 7/2006 | Cohen et al. ...................... 707/3 |

OTHER PUBLICATIONS http://web.archive.org/web/20061005120303/www.google.com/corporate/index.html.*
http://web.archive.org/web/20060621121123/http://googleblog.blogspot.com/2006/06/its-nice-to-share.html.*

* cited by examiner

*Primary Examiner* — Thu Huynh
(74) *Attorney, Agent, or Firm* — Lisa Ulrich; Roberts Mlotkowski Safran & Cole, P.C.

(57) ABSTRACT

A method including receiving input from a user, retrieving data based on the input, generating a tabular display of the data according to default settings and adjustable user settings, and transmitting the tabular display to the user. A system having a server application structured and arranged to receive input from a user, retrieve data based on the input, generate a tabular display of the data according to default settings and adjustable user settings, and transmit the tabular display to the user, and a client application structured and arranged to display the tabular display.

40 Claims, 9 Drawing Sheets

| BOM name | Review Status | Assembly PN | Rev lvl | Bom state | Phy dgn | Location |
|---|---|---|---|---|---|---|
| Bill 7 | Complete | 00D9875 | 4 | Prototype | Fixed | NY |
| Bill 6 | Incomplete | 00C0506 | 3 | Prototype | Fixed | NY |
| Bill 5 | Incomplete | 00B1234 | 1 | Design | Fixed | TX |
| Bill 4 | Incomplete | 00B0012 | 3 | Concept | Fixed | NY |
| Bill 3 | Complete | 00A7526 | 2 | Design | Open | NC |
| Bill 2 | Incomplete | 00A6466 | 1 | Concept | Open | TX |
| Bill 1 | Complete | 00A6465 | 1 | Concept | Open | NY |

FIG. 3B

| Object_ID | User_Object_ID | Default_Profile_ID | Display_Column_Order | Sort_Column_Order | Sort_Order |
|---|---|---|---|---|---|
| 47 | 3 | 9 | 4 | | |
| 48 | 3 | 10 | 2 | | A |
| 49 | 3 | 11 | 1 | 2 | |
| 50 | 3 | 12 | 3 | 3 | A |
| 51 | 3 | 14 | 5 | | |
| 52 | 3 | 15 | 6 | | |
| 53 | 3 | 16 | 7 | 1 | A |

| Bom state | BOM name | Location | Assembly PN | Phy dgn | Rev lvl | Review Status |
|---|---|---|---|---|---|---|
| Concept | Bill 1 | NY | 00A6465 | Open | 1 | Complete |
| Design | Bill 3 | NC | 00A7526 | Open | 2 | Complete |
| Prototype | Bill 7 | NY | 00D9875 | Fixed | 4 | Complete |
| Concept | Bill 4 | NY | 00B0012 | Fixed | 3 | Incomplete |
| Concept | Bill 2 | TX | 00A6466 | Open | 1 | Incomplete |
| Design | Bill 5 | TX | 00B1234 | Fixed | 1 | Incomplete |
| Prototype | Bill 6 | NY | 00C0506 | Fixed | 3 | Incomplete |

CONFIGURABLE COLUMN DISPLAY OF INFORMATION AT A WEB CLIENT

FIELD OF THE INVENTION

The invention generally relates to a method, product and system for displaying information in tabular form, and more particularly to a method, product and system related to a configurable display of information.

BACKGROUND OF THE INVENTION

Client applications are generally restricted to displaying data in a configuration that is predetermined by the server application. That is, a user displaying information from a website (e.g., internet, intranet, world wide web, etc.) is restricted to viewing the information in a fixed configuration defined by the website designer. For example, a user viewing information arranged in tabular form on a website is restricted to a fixed set of columns by which the data can be viewed. Even more particularly, a user viewing tabular data on a website, for example, as a result of a database query, is restricted to the output configuration defined by the website designer.

In the existing environment, tabular displays of records are configured during design as desired by the designer of the application (e.g., website, database, etc.). As such, tabular data displays are seldom designed by those who will employ them for drawing conclusions. It is often the case that an application designer, with many different users in mind, does not optimize the configuration for any one user, but, rather, defines a configuration that will be the most beneficial to the greatest number of users. However, the configuration that is defined by the website designer/creator may not always be the most intuitive or informative for a particular user. As a result, a particular user may find it difficult to locate and work with specifically required data for a particular task. Such difficulty can lead to lower efficiency when analyzing data, thereby reducing productivity of the user.

Thus, existing systems do not adequately serve the needs of some users, especially those without specialized training or experience attempting quickly to discern relationships between and among elements in large sets of data. Existing applications typically focus on presenting the data.

Accordingly, there exists a need in the art to overcome the deficiencies and limitations described hereinabove.

SUMMARY OF THE INVENTION

In a first aspect of the invention, a method comprises receiving input from a user, retrieving data based on the input, generating a tabular display of the data according to default settings and adjustable user settings, and transmitting the tabular display to the user.

In a second aspect of the invention, there is provided a computer program product comprising a computer readable medium having a computer readable program. The computer readable program when executed on a computer causes the computer to: receive input from a user; retrieve data based on the input; generate a tabular display of the data according to default settings and adjustable user settings; and transmit the tabular display to the user.

In a third aspect of the invention, a method for deploying an application for displaying information from a website in tabular form comprises providing a computer infrastructure being operable to: receive input from a user; retrieve data based on the input; generate a tabular display of the data according to default settings and adjustable user settings; and transmit the tabular display to the user.

In a fourth aspect of the invention, a system comprises a server application structured and arranged to receive input from a user, retrieve data based on the input, generate a tabular display of the data according to default settings and adjustable user settings, and transmit the tabular display to the user. The system further comprises a client application structured and arranged to display the tabular display.

In a fifth aspect of the invention, a system comprises a server having a database containing data associated with one or more default settings and adjustable user settings, and at least one of a hardware and a software component for receiving input from a user, retrieving data based upon the input, generating a tabular display, and transmitting the tabular display to the user, wherein the system generates the tabular display according to the retrieved default settings and adjustable user settings.

DETAILED DESCRIPTION OF EMBODIMENTS OF THE INVENTION

The invention is directed to a method, product and system for configuring tabular data displayed on a website. According to the invention, a method, product and system allow a user to decide in which order to arrange the columns of the tabular data, and to decide the sort order of the data within the columns. In this manner, the user may locate the data in a more informative and intuitive fashion, thereby becoming more efficient at analyzing the data.

In an embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The processes described herein can be implemented in the infrastructure shown in FIG. 1A.

In another embodiment, the invention provides a business method that performs the process steps of the invention on a subscription, advertising, and/or fee basis. That is, a service provider, such as a Solution Integrator, could offer to allow a user to configure tabular displays, store user settings, etc. In this case, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

Figure 1A:
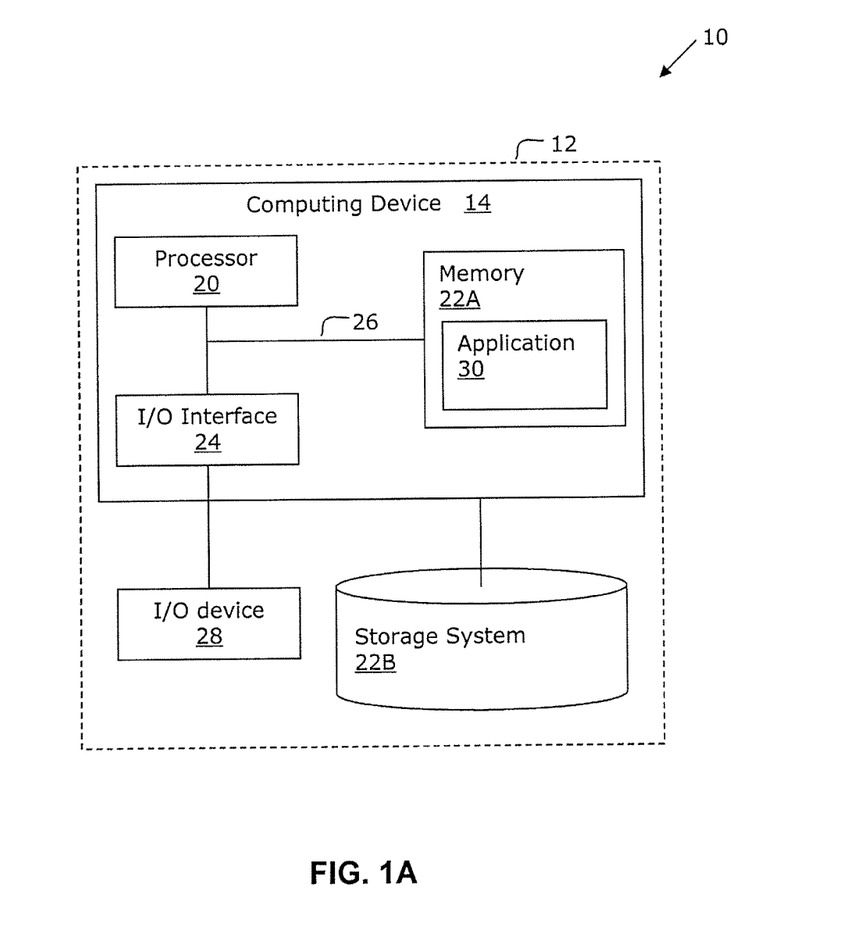
FIG. 1A shows an illustrative environment according to aspects of the invention.

FIG. 1A shows an illustrative environment 10 for managing the processes in accordance with embodiments of the invention. To this extent, the environment 10 includes a computer infrastructure 12 that can perform the processes described herein, such as, for example, retrieving data, configuring display settings, generating tabular displays, and displaying tabular displays. In particular, the computer infrastructure 12 is shown including a computing device 14 that comprises an application 30, which makes computing device 14 operable to perform at least some of the processes described herein. The computing device 14 is shown including a processor 20, a memory 22A, an input/output (I/O) interface 24, and a bus 26. Further, the computing device 14 is shown in communication with an external I/O device/resource 28 and a storage system 22B. As is known in the art, in general, the processor 20 executes computer program code, which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link.

In any event, the computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in other embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in one embodiment, the computer infrastructure 12 comprises two or more computing devices (e.g., a server cluster) that communicate over any type of communications link, such as a network, a shared memory, or the like, to perform the process described herein. Further, while performing the process described herein, one or more computing devices in the computer infrastructure 12 can communicate with one or more other computing devices external to computer infrastructure 12 using any type of communications link. In either case, the communications link can comprise any combination of various types of wired and/or wireless links; comprise any combination of one or more types of networks (e.g., the Internet, a wide area network, a local area network, a virtual private network, etc.); and/or utilize any combination of various types of transmission techniques and protocols. As discussed herein, the application 30 enables computer infrastructure 12 to perform the processes described herein, such as, for example, retrieving data, configuring display settings, generating tabular displays, and displaying tabular displays.

Figure 1B:
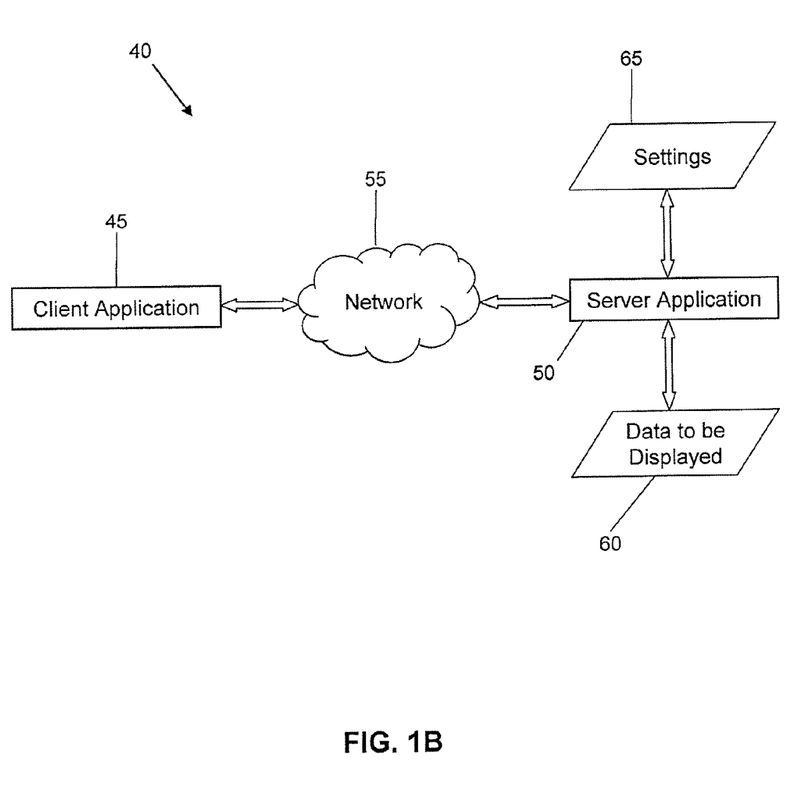
FIG. 1B shows an illustrative system according to aspects of the invention.

FIG. 1B shows an illustrative system 40 according to aspects of the invention. The system 40 includes a client application 45 that communicates with a server application 50 through a network 55. The client application 45 and server application 50 may respectively comprise of any type of computing device, such as, for example, those described above. The network 55 may be composed of any type of communication link that allows communication between the client and server applications, such as, for example, those described above.

In embodiments, the client application 45 allows a user to send a query to the server application, to configure settings for tabular displays of data, and to display the tabular displays for viewing and/or use by the user. For example, the client application 45 may comprise a web browser.

In embodiments, the server application 50 is operable to receive queries form the client application, retrieve data 60 according to the queries, and configure tabular displays of retrieved data according to settings 65. For example, the server application 50 may comprise a database server. The data 60 and/or settings 65 may be stored separately from, or commonly with, the server application 50. For example, the data 60 and/or settings 65 may be stored in remote databases that the server application 50 accesses, or, alternatively, may be stored in a computing device with the server application 50.

Figure 2:
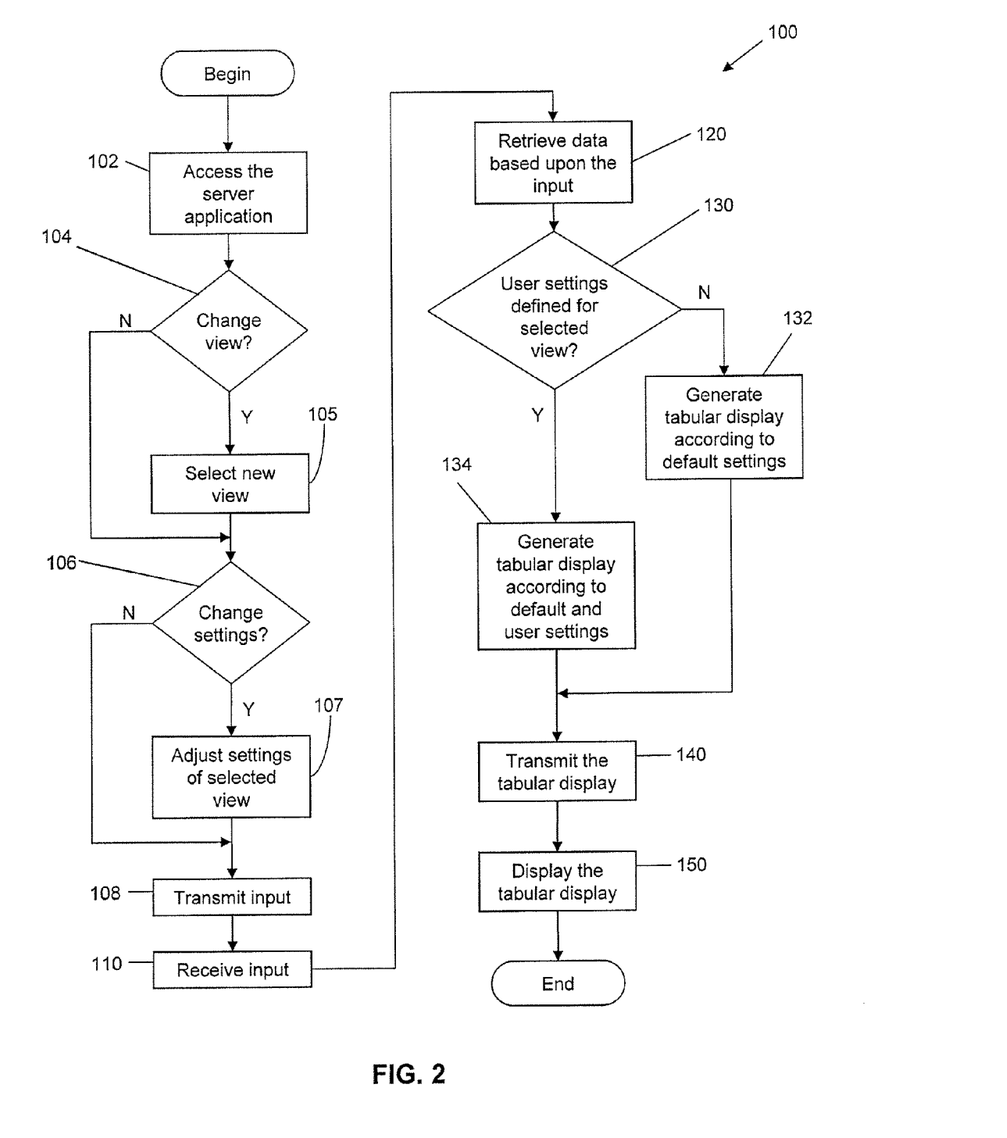
FIG. 2 shows a flow diagram of a method in accordance with aspects of the invention.

FIG. 2 is a flow diagram implementing a method of the invention. FIG. 2 may equally represent a high-level block diagram of the invention. The method of FIG. 2 (and all of the flow diagrams) may be implemented and executed from either a server, in a client-server relationship, or they may run on a user workstation with operative information conveyed to the user workstation to create the navigation outlined above. Additionally, the invention can take the form of an entirely hardware embodiment, an entirely software embodiment or an embodiment containing both hardware and software elements, or the invention can be executed at least partially manually. The steps of FIG. 2 (and all other flow diagrams) may also be representative of a high-level block diagram implementing the method.

FIG. 2 shows a flow diagram depicting a method 100 for generating and displaying tabular data according to embodiments of the invention. As depicted at 102, a user utilizes the client application 45 to access the server application 50. For example, a communication link may be established between a first computing device (e.g., personal computer, workstation, laptop, personal digital assistant, telephone, etc.) equipped with the client application (e.g., web browser software, database client software, etc.) and a second computing device equipped with the server application. The accessing at 102 may require the user to login with a unique identification (e.g., username and password).

In embodiments, an initial view is automatically selected when the user first accesses the server application. The initial view may be, for example, the last view that the user accessed in a previous usage, or a default initial view. The user may proceed with the initial view as the selected view, or may decide to change the view at step 104. If the user decides to change the view, then at step 105 a different view may be selected, for example, by using the mouse pointer of a client application (e.g., web browser) to select a particular view from a list of possible views.

The user chooses to configure the settings for the selected view at step 106. If the user decides to configure the settings, then at step 107 the user may adjust designated settings, for example, by way of a graphical user interface (GUI) that is displayed via the client application.

It is noted that a user does not necessarily need to select a view and/or configure settings prior to each instance of displaying tabular data. For example, an initial view may be designated by the server application and automatically presented upon access at step 102. If the user is satisfied with the initial view, then there is no need to select a different view. Moreover, if the user is satisfied with the settings of the selected view (whether it is an initially or subsequently selected view), then there is no need to configure (e.g., adjust) the settings. It is further noted that a user is not limited to selecting a view and/or configuring settings only immediately after accessing the server application at step 102. For example, the user may select a view and/or configure settings at other times during the method, such as, for example, after displaying the tabular data.

Still referring to FIG. 2, as shown at step 108, the user transmits input from the client application to the server application. In embodiments, the client application is used to generate the input, such as, for example, a database query. The input may be generated in any known manner, such as, for example, typing character strings, clicking icons with a mouse pointer, selecting an item form a drop-down menu, etc. The input is transmitted as data over a network (e.g., internet, intranet, LAN, WAN, etc.) and received by the server application.

The input is received from the user at step 110. For example, a database query (i.e., input) that the user typed into a web browser (i.e., client application) is received by a database server (i.e., server application). Then, at step 120, data is retrieved in response to the input received in step 110. In embodiments, the server application 50 that receives the input also operates to retrieve the data. For example, the server application 50 may be a database application that receives the input and retrieves the appropriate data from an associated database. More specifically, a database application may receive a database query from the user, and retrieve the results of the query from the stored data of the database. Of course, the server application 50 that received the input need not also perform the data retrieval. Rather, the server application 50 may pass the input along to a separate component that performs the data retrieval. Moreover, the data 60 need not be stored in the form of a database, but, instead, may be embodied in any known type of data storage.

At step 130, a determination is made whether the user has defined user settings for the selected view. If the user has not defined any user settings for the selected view, then the tabular display of the retrieved data is generated at step 132 according to the default settings of the selected view. If the user has defined user settings for the selected view, then the tabular display of the retrieved data is generated at step 134 according to the default settings and the user settings of the selected view.

The default and user settings may be any parameter defined in the server application, as will be understood by one of ordinary skill in the art. In embodiments, the default settings are stored in a file and are accessible (e.g., viewable, modifiable, etc.) only by administrators with proper authorization (i.e., a typical user will not have access to the default settings). The user settings are the settings that are optionally configured at step 107. The user settings may be stored in a file to be retrieved by the server application 50 for presentation to the user via the client application 45 such that the user may adjust the user settings at step 107. The system can support multiple users. Each user will have personal user settings that can be modified as desired, wherein the personal user settings are initially based upon common default settings. The default settings and user settings may be stored as part of the server application, or separately from the server application (e.g., in a database that is remote from and accessed by the server application)

In embodiments, the default settings define the arrangement of tabular data to be displayed in response to a database query. For example, as described in greater detail below, the default settings may include parameters that define: which columns of data are displayed, the name of each displayed column, the database location of the data contained in each column, the order that the columns are displayed relative to each other, the order that the data in the columns is sorted in relative to each other, and whether the data in a column is sorted in ascending or descending fashion. The user settings, which are described in greater detail below, define which parameters of the default settings to override and values for the parameters that are overridden (e.g., the order that the columns are displayed relative to each other, the order that the data is sorted in, and whether the data is sorted in ascending or descending fashion). In this manner, the server application (or a related component) uses the default settings and/or the user settings to format the data when generating the tabular display transmitted to the client application.

At step 140, the tabular display generated in step 130 is transmitted to the client application 45. In embodiments, this is accomplished in a known manner, for instance, by transmitting data that defines the tabular display over the same network 55 used in step 110. At step 150, the tabular display is displayed by the client application. In this way, the user may view and use the tabular display in an arrangement most advantageous to the user's task. For example, the user may use the client application (e.g., web browser) to view the results of a database query in tabular form on their computer screen.

EXAMPLE OF USE

Figure 3A:
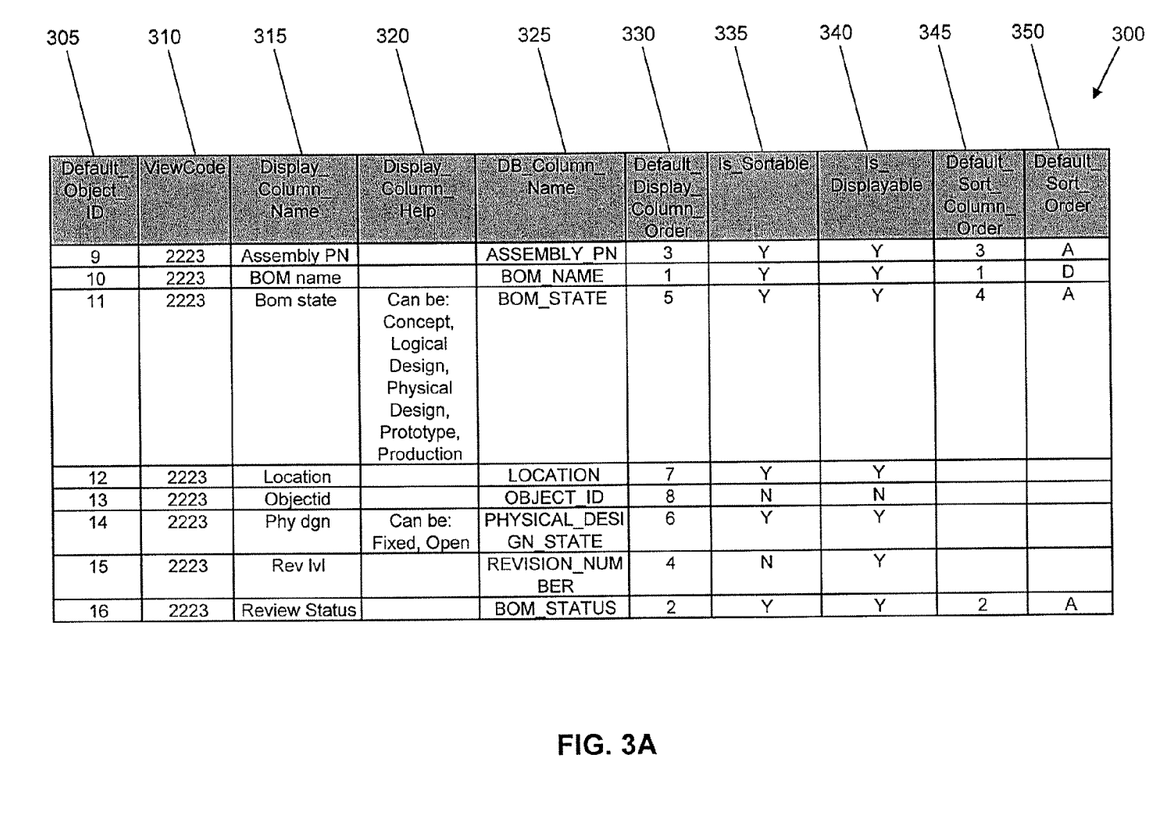
FIGS. 3A-3B show exemplary settings and an exemplary display according to aspects of the invention.
Figure 3B:
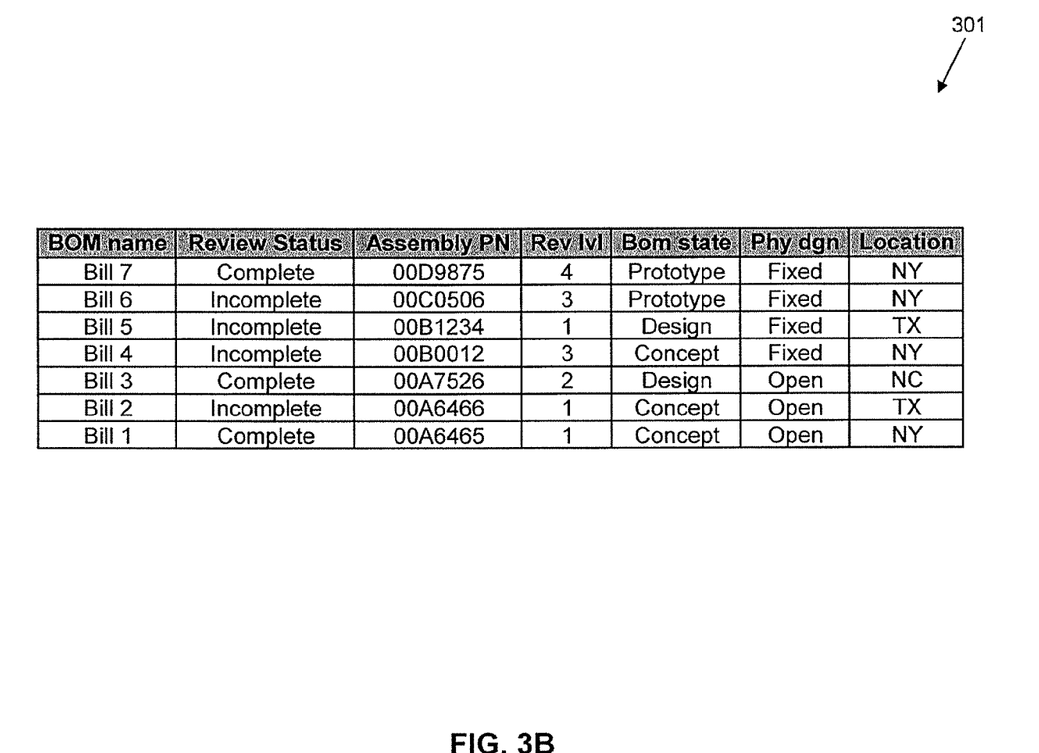

FIG. 3A shows an exemplary default settings table 300 according to embodiments of the invention, and FIG. 3B shows an exemplary tabular display 301 generated according to the default settings depicted in FIG. 3A. As seen in FIG. 3A, the default settings are stored as a table with columns and rows, and define the configuration in which tabular data will be displayed in response to a user input. The default settings alone are sufficient to adequately define the format of a display generated by the server application in response to a user input. In other words, in the user's initial query to the server application, i.e., before any user settings have been defined, the tabular display 301 is generated according to the default settings.

In this example, the default settings table 300 contains the following columns: Default_Object_ID 305, ViewCode 310, Display_Column_Name 315, Display_Column_Help 320, DB_Column_Name 325, Default_Display_Column_Order 330, Is_Sortable 335, Is_Displayable 340, Default_Sort_Column_Order 345, and Default_Sort_Order 350. These columns contain data that define how the tabular display will be generated and where the data to populate the tabular display is stored. The data in the default setting table 300 is created and controlled by an administrator (e.g., creator, designer, and/or manager, etc.) of the server application according to any desired intended use.

Default_Object_ID 305 contains values of a unique identifier assigned to each row of the default settings table 300. This allows the user settings table, described below, to refer back to appropriate portions the default settings table 300.

ViewCode 310 contains values of a unique code that represents the format of a particular view. There may be numerous view codes, each corresponding to a unique default view that has been defined by the administrator. For example, the ViewCode value "2223" may correspond to a first default view configuration that has been tailored to a particular task, such as examining the bills of material (BOMs) for a facility. Alternatively, a different ViewCode value "2224" may correspond to a second default view configuration that has been tailored to a different task, such as examining the engineering work requests of the facility. The different default view configurations may differ in their respective display parameters (e.g., what columns are displayed, what order the columns are displayed in, the sort order, etc.) to facilitate different intended uses of displays.

Display_Column_Name 315 contains values of indicia that will be displayed in the header row of each column of the tabular display 301. The indicia may be any indicia (e.g., text, numerals, symbols, etc.) desired and defined by the administrator. For example, the columns in the tabular display 301 in FIG. 3B are titled "Assembly PN", "BOM name", "Bom state", etc.

Display_Column_Help 320 contains values of indicia that will be displayed if, in the client application, the user places the cursor (e.g., mouse pointer) over the corresponding column of the tabular display 301. The indicia may be any indicia (e.g., text, numerals, symbols, etc.) desired and defined by the administrator. For example, in the client application, when a user places the mouse pointer over the "Bom state" column of the tabular display 301, a box with the text "Can be: Concept, Logical Design, Physical Design, Prototype, Production" is superimposed over the tabular display 301. Programming methods for providing such a superimposed display in response to mouse pointer location are known and further description is not believed necessary.

DB_Column_Name 325 contains values of the column name of the database where the server application (or other component) retrieves data in response to the user input. These values are the column name of a table where the data is actually stored, such as, for example, in a database, as will be understood by the skilled artisan.

Default_Display_Column_Order 330 contains values that define what order the columns will be displayed in relative to other columns. In this example, the column named "Assembly PN" has a Default_Display_Column_Order value of "3", and, therefore, is the third column in the tabular display 301. Likewise, the column named "BOM name" has a Default_Display_Column_Order value of "1", and, therefore, is the first column in the tabular display 301.

Is_Sortable 335 contains values that define whether or not the data of the generated tabular display may be sorted by a particular column of data of the display. In this example, a value of "Y" indicates that the data in the "Assembly PN" column may be used to sort the data of the generated tabular display. Conversely, a value of "N" indicates that the data in the "Rev lvl" column may not be used to sort the data of the generated tabular display. The administrator may define which columns may, or may not, be used to sort based upon any desired intended use.

Is_Displayable 340 contains values that define whether a particular column is shown in the generated tabular display. For example, a value of "Y" indicates that the column "Assembly PN" is shown as part of the tabular display 301. Conversely, a value of "N" indicates that the column "Objectid" is not shown as part of the tabular display 301. The administrator may define which columns are, or are not, displayed based upon any desired intended use.

Default_Sort_Column_Order 345 contains values that define what order the data of the tabular display 301 is sorted in when it is generated, and Default_Sort_Order 350 contains values that define whether the sorting will be ascending or descending. In embodiments, a value of "A" defines ascending sort order, and a value of "D" defines descending sort order. For example, when the tabular display is generated, the data in the tabular display 301 is sorted first in descending order by the data in the "BOM name" column because of the Default_Sort_Column_Order value of "1" and Sort_Order value of "D". Likewise, the data in the tabular display 301 is sorted second in ascending order by the data in the "Review Status" column because of the Default_Sort_Column_Order value of "2" and Sort_Order value of "A".

FIG. 3B. shows a sample tabular display 301 generated according to default settings table 300. The column names, ordering of the columns, and sorting of the data are defined by the values in the default settings table 300, as described above. While the system designer may believe that the default settings display the tabular data in the most efficient arrangement for use, the user may prefer a different display configuration or order to satisfy specific user requirements for the data.

Figure 4A:
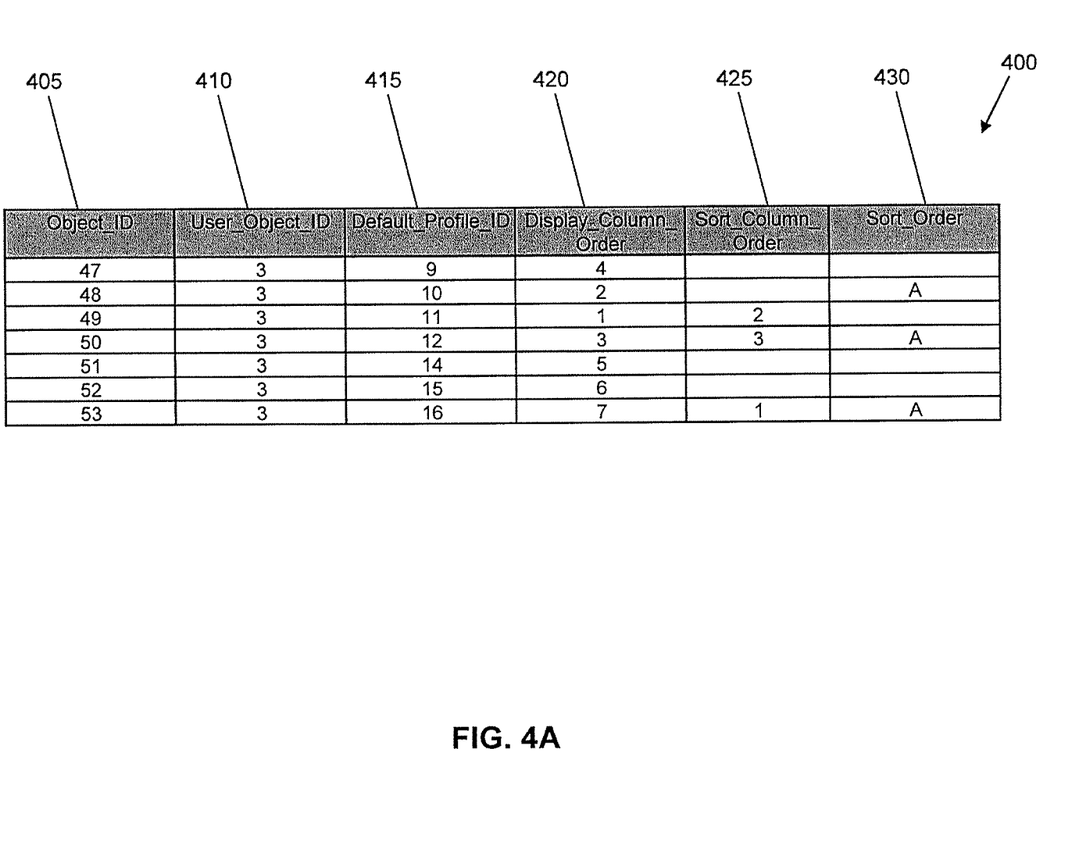
FIGS. 4A-4B show exemplary settings and an exemplary display according to aspects of the invention.
Figure 4B:
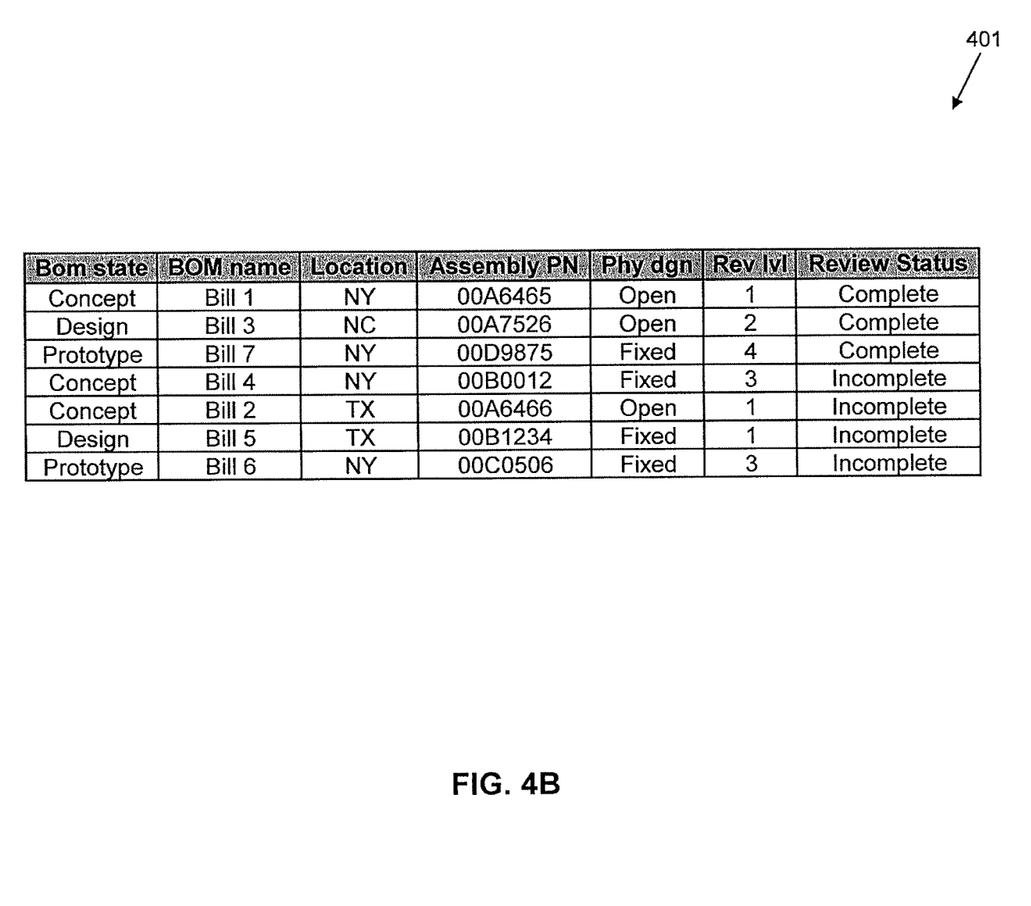

FIG. 4A shows an exemplary user settings table 400 containing user settings according to embodiments of the invention, and FIG. 4B shows an exemplary tabular display 401 that is generated according to both the default settings depicted in FIG. 3A and the user settings depicted in FIG. 4A. As seen in FIG. 4A, the user settings are stored as a table with columns and rows. Certain values in the user settings table 400 override corresponding values in the default settings table 300, such that the user can adjust the tabular display to their liking.

In this example, the user settings table 400 contains the following columns: Object_ID 405, User_Object_ID 410, Default_Profile_ID 415, Display_Column_Order 420, Sort_Column_Order 425, and Sort_Order 430. These columns contain data that define how the tabular display will be generated. The data in the user setting table 400 may be adjusted by a user, as described in greater detail below.

Object_ID 405 contains values of a unique identifier assigned to each row of the user settings table 400. User_Object_ID 410 contains values that represent a unique identification for the current user. For example, a first user may have an identification value of "3". Another user may have an identification value of "55". The User_Object_ID may be any indicia (e.g., letters, numbers, symbols, etc.), and is assigned to a particular user when the user creates an account with (or is given an account by) the server application and/or administrator. In this manner, the system may store and apply specific user settings for each user.

Default_Profile_ID 415 contains values that refer to the Default$_{13}$Object_ID 305 of the default settings table 300. A value in this column defines a row in the default settings table 300 for which values will be overridden by values of the user settings table 400. That is, values of the Default_Profile_ID provide a reference between the user settings table 400 and the default settings table 300.

Display_Column_Order 420 contains values that define the order that the columns will be displayed relative to other columns. During display generation, values in this column of the user settings table 400 override corresponding values of Default_Display_Column_Order 330 in the default settings table 300. For example, the Display_Column_Order value of "1" and the Default_Profile_ID value of "11" in the same row dictate that the column of data having the Default_Object_ID value of "11" (in the default settings table 300) is displayed first in the tabular display 401. As seen from FIG. 3A, the Default_Object_ID value of "11" corresponds to the "Bom state" column of data. Thus, as seen in FIG. 4B, the "Bom state" column is displayed first.

Similarly, the Display_Column_Order value of "2" and the associated Default_Profile_ID value of "10" in the same row dictate that the column of data having the Default_Object_ID value of "10" (in the default settings table 300) is displayed second in the tabular display 401. As seen from FIG. 3A, the Default_Object_ID value of "10" corresponds to the "BOM name" column of data. Thus, as seen in FIG. 4B, the "BOM name" column is displayed second. In this manner, the invention uses values of the user settings table 400 to reference back to and override corresponding values of the default settings table 300 during generation of the tabular display.

Sort_Column_Order 425 contains values that define what order the data of the tabular display 401 is sorted in when the tabular display 401 is generated. Similar to the operation of Display_Column_Order 420 described above, any values in this column supersede corresponding values in the default settings table 300. For example, the Sort_Column_Order value of "1" and the Default_Profile_ID value of "16" in the same row dictate that the data in the tabular display 401 is sorted first by the data associated with the Default_Object_ID value of "16". As seen from FIG. 3A, the Default_Object_ID value of "16" corresponds to the "Review Status" column of data. Thus, as seen in FIG. 4B, the data in the tabular display 401 is sorted first by the data in the "Review Status" column.

Similarly, the Sort_Column_Order value of "2" and the Default_Profile_ID value of "11" in the same row dictate that the data in the tabular display 401 is sorted second by the data associated with the Default_Object ID value of "11". As seen from FIG. 3A, the Default_Object_ID value of "11" corresponds to the "BOM state" column of data. Thus, as seen in FIG. 4B, the data in the tabular display 401 is sorted second by the data in the "BOM state" column.

Likewise, the Sort_Column_Order value of "3" and the Default_Profile_ID value of "12" in the same row dictate that the data in the tabular display 401 is sorted third by the data associated with the Default_Object_ID value of "12". As seen from FIG. 3A, the Default_Object_ID value of "12" corresponds to the "Location" column of data. Thus, as seen in FIG. 4B, the data in the tabular display 401 is sorted third by the data in the "Location" column.

Sort_Order 430 contains values that define whether the sorting of data will be ascending or descending. A value of "A" defines ascending sort order, and a value of "D" defines descending sort order. For example, when the tabular display 401 is generated, the first sort by "Review Status", described above, is done in ascending order of the data in the in the "Review Status" column. Likewise, the second sort by "BOM state" is done in ascending order of the data in the in the "BOM state" column, and the third sort by "Location" is done in ascending order of the data in the in the "Location" column.

In this manner, implementations of the invention provide that the user-defined values of Display_Column_Order 420, Sort_Column_Order 425, and Sort_Order 430 of the user settings table 400 override the corresponding values of Default_Display_Column_Order 350, Default_Sort_Column_Order 345, and Default_Sort_Order 350 of the default settings table 300. However, some values of the default settings table 300 (e.g., ViewCode 310, Display_Column_Name 315, Display_Column_Help 320, DB_Column_Name 325, etc.) can be defined by the designer as not user-configurable, such that these values cannot be overridden by values of the user settings table 400. As such, the tabular display is generated according to a combination of values from both the default settings table 300 and the user settings table 400.

It is noted that the default settings table 300 and the user settings table 400 described above are merely exemplary aspects of the invention. Tables with different configurations (e.g., column names, numbers of rows, number of columns, etc.) are contemplated by the invention.

Figure 5:
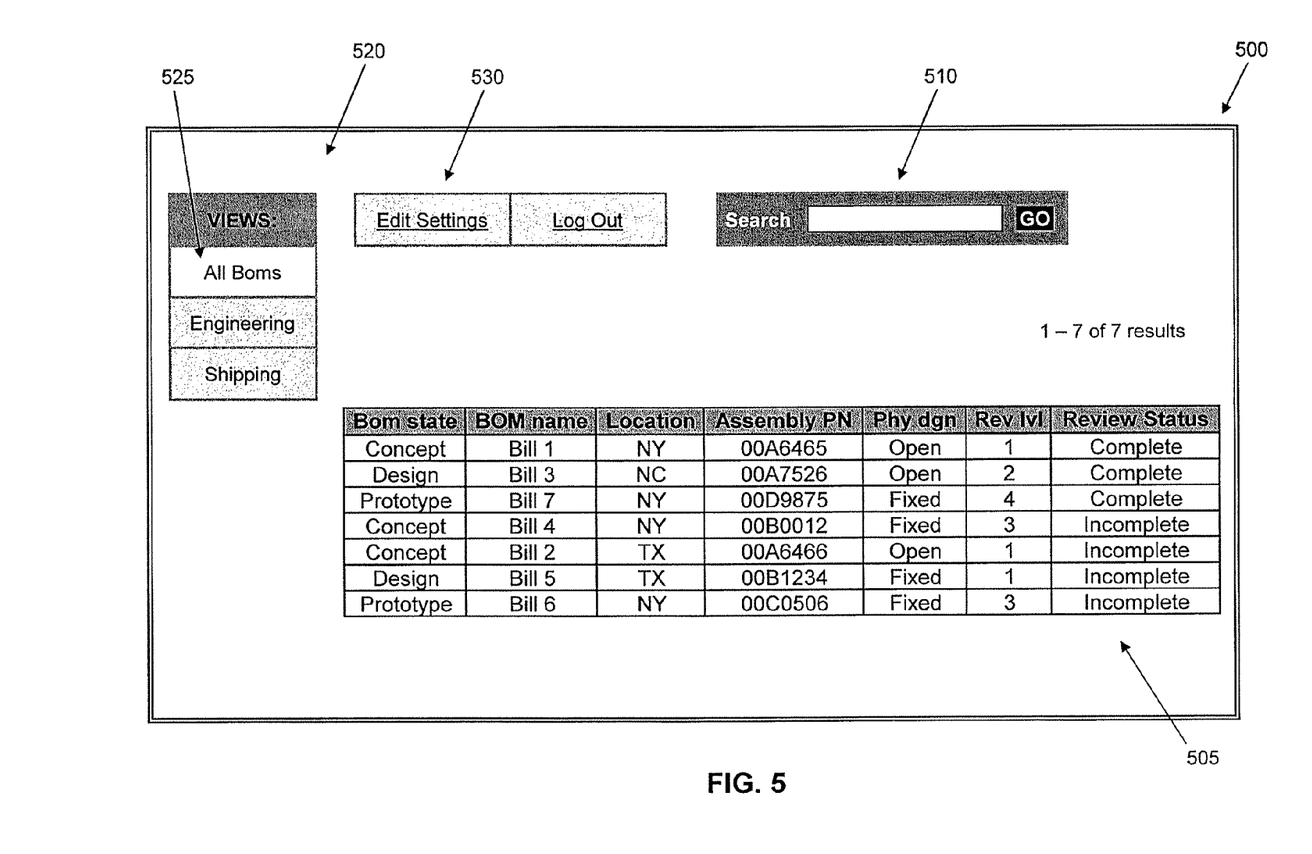
FIG. 5 shows an exemplary client application according to aspects of the invention.

FIG. 5 shows an exemplary client application according to embodiments of the invention. The client application may be any software implementation that receives and displays data from the server application over any type of network. In this exemplary embodiment, the client application is a web-based browser program that receives and displays data from the server application over an intranet. Additionally, the server application in this exemplary embodiment comprises a database program that receives input from the client application, retrieves data from a database, and generates and transmits webpage-style tabular displays for viewing via the client application. The system may be designed such that a user may log in using any known method, including, for example, clicking on an icon, entering a username and password, etc.

FIG. 5 shows client screen 500 having a tabular display of data 505, a data entry field 510, a list of available views 520, and an edit settings component 530. In this exemplary embodiment, the data entry field 510 is the component by which the user sends input to the server application. For example, the user sends input (e.g., search, query, etc.) to the server application by typing a command into the data entry field 510 and clicking the button labeled "GO" or by pressing the "Enter" key on a keyboard. This transmits the input to the server application. The server application (or other component) then retrieves data in response to the input and generates a tabular display of the data according to the user and/or default settings. Lastly, the server application transmits the tabular display to the client application, and the client application displays it as tabular display 505.

As described above, the tabular display is generated according to default settings and user settings (if any exist). In this exemplary embodiment, the list of available views 520 shows a list of possible views, which are at least initially defined according to the default settings of the system designer, for the user to choose from. Each view in the list of available views 520 corresponds to a range of entries in the default settings table, and may also correspond to a range of entries in the user settings table. In this example, the "All Boms" view is shown as the active view 525 and corresponds to the range of entries in the default settings table 300 that all have a ViewCode value of "2223". Similarly, the "Engineering" view is shown as inactive, and may correspond to the range of entries in the default settings table 300 that all have a ViewCode value of "2224".

The user may select the active view 525 from the list of available views 520 in any known manner, such as, for example, clicking the mouse pointer on a corresponding portion of the list of available views 520. For example, the user may change the active view from "All Boms" to "Engineering" by moving the mouse pointer over the text "Engineering" and clicking the mouse button. Then, the requested tabular displays will be generated according to the default settings (and user settings, if any exist) of the now active "Engineering" view.

Figure 6:
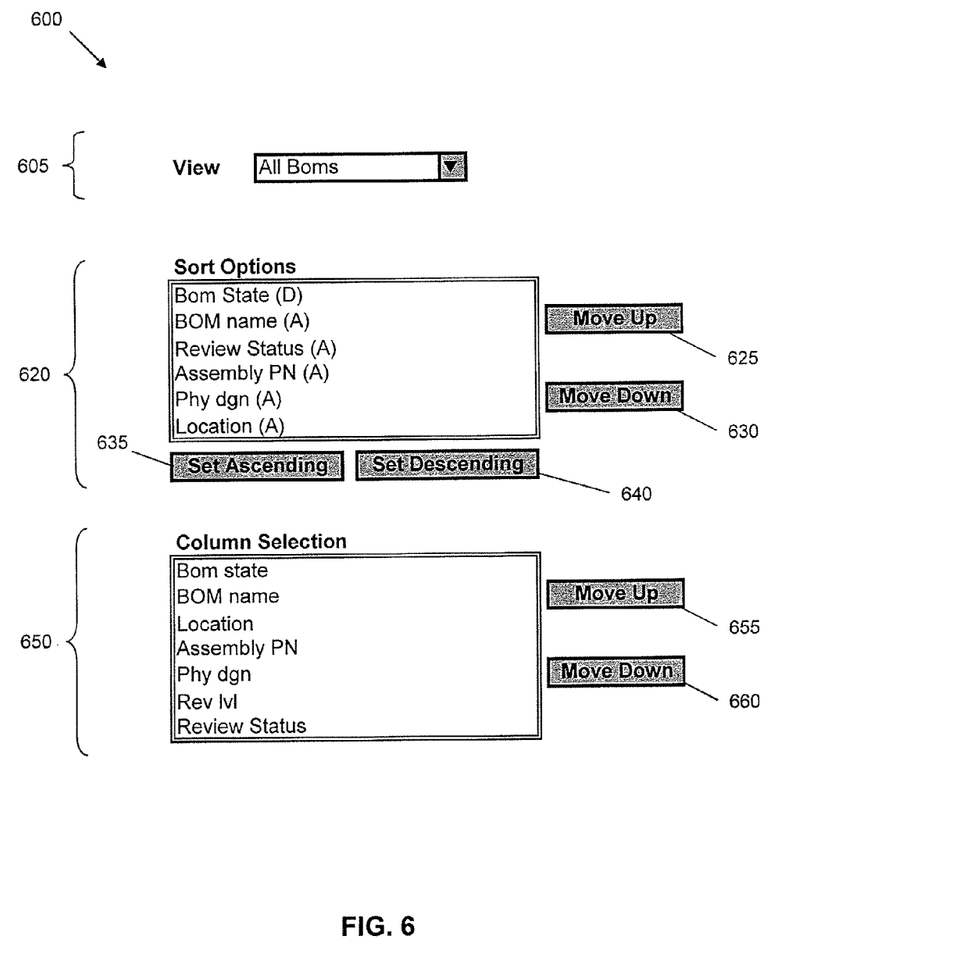
FIG. 6 shows an exemplary graphical user interface according to aspects of the invention.

The edit settings component 530 is a way for the user to adjust the values in the user settings table 400. In this exemplary embodiment, the edit settings component 530 is selected by placing the mouse pointer over the text "Edit settings" and clicking the mouse button. At this point, the server application transmits a graphical user interface (GUI) 600 to the client application for editing the user settings.

The GUI 600 of this exemplary embodiment is depicted in FIG. 6, and comprises a view selecting portion 605, sort options portion 620, and column selection portion 650. The view selecting portion 605 includes a drop-down menu with a list of views that corresponds to the list of available views 520. The user may select any of the views in the drop-down menu by highlighting the particular view with the mouse pointer. Such GUI manipulation is known in the art. In the example shown in FIG. 6, the "All Boms" view is shown as selected. Therefore, any user manipulation of the sort options portion 620 and/or column selection portion 650 results in changes in the user settings that affect the "All Boms" view.

When a particular view is selected in the view selecting portion 605, the sort options portion 620 and column selection portion 650 display graphical representations of values of the default settings table 300 and/or the user settings table 400 that correspond to the selected view. The sort options portion 620 displays the values predefined by the designer as configurable, i.e., the values of Display_Column_Name 315 having an associated Is_Sortable 335 value of "Y". Thus, in this example, the sort options portion 620 shows the column names "Assembly PN", "BOM name", "BOM state", "Location", Phy dgn", and "Review Status".

The sort options portion 620 also depicts the current sort column order of the selected view by displaying the column names of sortable columns in order, from top to bottom as shown in FIG. 6. The column names are displayed in the sort options portion 620 according to the values of Default_Sort_Column_Order 345 and/or Sort_Column_Order 425. For example, if the user has never previously adjusted the values of Sort_Column_Order 425 for this selected view, then the default settings in Default_Sort_Column_Order 345 determine the order of the column names in sort options portion 620. If, however, the user has stored settings for the values of Sort_Column_Order 425 for this selected view, then the user settings in Sort_Column_Order 425 determine the order of the column names in sort options portion 620.

The user may change the sort column order for the selected view by highlighting a column name in the sort options portion 620, and then clicking on the Move Up button 625 or Move Down button 630. For example, if a user highlights "BOM name(A)" and clicks the Move Up button 625, then the sort options portion 620 would change such that "BOM name (A)" is depicted directly above "BOM state(D)". Such GUI manipulation is well known in the art.

Moving the column names up and down in the sort options portion 620 causes the server application to overwrite the appropriate values of Sort_Column_Order 425 of the user settings table. The final ordering of the sort options portion 620 is saved in the user settings table 400, and affects the generation of tabular displays. In the exemplary embodiment shown in FIG. 6, the value of Sort_Column_Order 425 would be set to a value of "1" in the row of the user settings table 400 that corresponds to Display_Column_Name "BOM state" for the selected view (i.e., "All Boms" view having View-Code="2223"). Similarly, the value of Sort_Column_Order 425 would be adjusted to "2" in the row that corresponds to Display_Column_Name "BOM name" for the selected view. In this manner, the user utilizes the GUI 600 to adjust the sorting of the data for any tabular display 505 generated according to the selected view.

Also shown in sort options portion 620 is a representation "(A)" or "(D)" after each column name, which graphically represents the ascending or descending value of the Default_Sort_Order 350 and/or Sort_Order 430 for the selected view. The user may adjust these values by highlighting the column name in the sort options portion 620 and then clicking either the Set Ascending button 635 or the Set Descending button 640. For example, as shown in FIG. 6, the "BOM state" column of the selected view is currently set to a sort order of descending. Highlighting the "BOM state" line in sort options portion 620 and then clicking the Set Ascending button 635 will change the sort order to descending (i.e., will set the value of Sort_Order 430 to "A" in the row of the user settings table 400 that corresponds to Display_Column_Name "BOM state" for the selected view). In this manner, the user utilizes the GUI 600 to adjust the sorting of the data for any tabular display 505 generated according to the selected view.

The GUI 600 also includes a column selection portion 650 that provides the user with a way to change the column display order for the selected view. The column selection portion 650 graphically shows all of the columns that are displayed in generated tabular displays 505 of the selected view. The order of the columns in the column selection portion 650 corresponds to the order of the columns in the tabular display 505 of the selected view. For example, as shown in FIG. 6, the column "BOM state" is displayed first, "BOM name" second, "Review Status" third, etc., for the selected view (i.e., "All Boms"). The user may adjust the column display order for the selected view by highlighting a column name in column selection portion 650 and then clicking either the Move Up button 655 or the Move Down button 660. This results in the column name moving up or down relative to the other column names depicted in column selection portion. Such GUI manipulation is known in the art. The final order of the column names in the column selection portion 650 is saved to the corresponding entries of the user settings table 400. In this manner, the user utilizes the GUI 600 to adjust the display order of the columns for any tabular display 505 generated according to the selected view.

When the user is finished adjusting the desired view(s), the user may exit the GUI 600 and return to the client screen 500. At this point the user may send input to the server application (to create a tabular display), return to the GUI 600, or log out.

In this manner, embodiments of the invention comprise a system having a server application and a client application, where the server application supports use by multiple individual users. The server application may have numerous default views that are provided to each user. Additionally, each user may optionally adjust the settings of aspects of the respective default views in order to adjust the display configuration of tabular data, thereby increasing aesthetic value, efficiency and/or productivity. Although the invention has been described with respect to database queries and tabular displays of database results, it is understood that embodiments could be employed in other applications, such as, for example, Internet search results, Internet commerce, etc.

While the invention has been described in terms of embodiments, those skilled in the art will recognize that the invention can be practiced with modifications and in the spirit and scope of the appended claims.

What is claimed:

1. A method of displaying tabular data, comprising:
receiving a definition of adjustable user settings from a user;
receiving input from the user after the receiving the definition of the adjustable user settings;
retrieving data based on the input;
a processor of a computer generating a tabular display of the data according to default settings and the user settings; and
transmitting the tabular display to the user,
wherein:
the default settings comprise a column name, a default display column order, a default sort column order, and a default sort order, and
the user settings comprise a user display column order, a user sort column order, and a user sort order.

2. The method of claim 1, wherein the receiving, the retrieving, the generating, and the transmitting are performed on a subscription, advertising, and/or fee basis.

3. The method of claim 2, wherein the receiving, the retrieving, the generating, and the transmitting are performed by a service provider.

4. The method of claim 1, further comprising creating, maintaining and/or supporting a computer infrastructure that performs the receiving, the retrieving, the generating, and the transmitting.

5. The method of claim 1, wherein the input is a database query.

6. The method of claim 1, wherein the user settings are adjustable using a graphical user interface (GUI) that is separate from a display window having the tabular display, and further comprising:
receiving a request to adjust the user settings;
as a result of the receiving the request, presenting the user with the GUI for editing the user settings;
receiving data defining the user settings via the GUI; and
storing the user settings in a file based on the received data;
wherein the generating the tabular display is performed using the user settings stored in the file.

7. The method of claim 1, wherein the user settings override corresponding default settings.

8. The method of claim 1, wherein the user settings comprise:
a first group of user settings that define a first configuration; and
a second group of user settings that define a second configuration,
wherein the generating is performed according to a chosen one of either the first group of user settings or the second group of user settings.

9. The method of claim 1, wherein:
the user is one of a plurality of users, and
each of the plurality of users shares the same default settings and has unique user settings.

10. The method of claim 1, wherein the transmitting comprises transmitting the tabular display from a server application to a client application.

11. The method of claim 1, wherein the default settings comprise:
a first group of default settings that define a first configuration; and
a second group of default settings that define a second configuration,
wherein the generating is performed according to a chosen one of either the first group of default settings or the second group of default settings.

12. The method of claim 11, wherein the user settings comprise:
a first group of user settings that correspond to the first group of default settings; and
a second group of user settings that correspond to the second group of default settings,
wherein the generating is performed according to a chosen one of either: the first group of default settings and the first group of user settings, or the second group of default settings and the second group of user settings.

13. A computer program product comprising a computer readable storage medium having a computer readable program embodied therewith, wherein the computer readable storage medium is not transitory signal per se, and the computer readable program when executed on a computer causes the computer to:
receive a definition of adjustable user settings from the user;
receive input from the user after the receiving the definition of the adjustable user settings;
retrieve data based on the input;
generate a tabular display of the data according to default settings and the user settings; and
transmit the tabular display to the user,
wherein:
the default settings comprise a column name, a default display column order, a default sort column order, and a default sort order, and
the user settings comprise a user display column order, a user sort column order, and a user sort order.

14. The computer program product of claim 13, wherein the input is a database query.

15. The computer program product of claim 13, wherein the user settings are adjustable using a graphical user interface (GUI) that is separate from a display window having a tabular display, and further comprising:
receiving a request to adjust the user settings;
as a result of the receiving the request, presenting the user with the GUI for editing the user settings;
receiving data defining the user settings via the GUI; and
storing the user settings in a file based on the received data;
wherein the generating the tabular display is performed using the user settings stored in the file.

16. The computer program product of claim 13, wherein the user settings override corresponding default settings.

17. The computer program product of claim 13, wherein the user settings comprise:
a first group of user settings that define a first configuration; and
a second group of user settings that define a second configuration,
wherein the generating is performed according to a chosen one of either the first group of user settings or the second group of user settings.

18. The computer program product of claim 13, wherein:
the user is one of a plurality of users, and
each of the plurality of users shares the same default settings and has unique user settings.

19. The computer program product of claim 13, wherein the transmitting comprises transmitting the tabular display from a server application to a client application.

20. The computer program product of claim 13, wherein the default settings comprise:
a first group of default settings that define a first configuration; and
a second group of default settings that define a second configuration, wherein the generating is performed according to a chosen one of either the first group of default settings or the second group of default settings.

21. The computer program product of claim 20, wherein the user settings comprise:
   a first group of user settings that correspond to the first group of default settings; and
   a second group of user settings that correspond to the second group of default settings,
   wherein the generating is performed according to a chosen one of either: the first group of default settings and the first group of user settings, or the second group of default settings and the second group of user settings.

22. A method for deploying an application for displaying information from a website in tabular form, comprising:
   providing a computer infrastructure being operable to:
      receive a definition of adjutsble user settings from a user;
      receive input from a user after receiving the definition of the adjustable user settings;
      retrieve data based on the input;
      generate a tabular display of the data according to default settings and the user settings; and
      transmit the tabular display to the user,
   wherein:
   the default settings comprise a column name, a default display column order, a default sort column order, and a default sort order, and
   the user settings comprise a user display column order, a user sort column order, and a user sort order.

23. The method of claim 22, wherein the input is a database query.

24. The method of claim 22, wherein the user settings are adjustable using a graphical user interface (GUI) that is separate from a display window having the tabular display, and further comprising:
   receiving a request to adjust the user settings;
   as a result of the receiving the request, presenting the user with the GUI for editing the user settings;
   receiving data defining the user settings via the GUI; and
   storing the user settings in a file based on the received data;
   wherein the generating the tabular display is performed using the user settings stored in the file.

25. The method of claim 22, wherein the user settings override corresponding default settings.

26. The method of claim 22, wherein the user settings comprise:
   a first group of user settings that define a first configuration; and
   a second group of user settings that define a second configuration,
   wherein the generating is performed according to a chosen one of either the first group of user settings or the second group of user settings.

27. The method of claim 22, wherein:
   the user is one of a plurality of users, and
   each of the plurality of users shares the same default settings and has unique user settings.

28. The method of claim 22, wherein the transmitting comprises transmitting the tabular display from a server application to a client application.

29. The method of claim 22, wherein the default settings comprise:
   a first group of default settings that define a first configuration; and
   a second group of default settings that define a second configuration,
   wherein the generating is performed according to a chosen one of either the first group of default settings or the second group of default settings.

30. The method of claim 29, wherein the user settings comprise:
   a first group of user settings that correspond to the first group of default settings; and
   a second group of user settings that correspond to the second group of default settings,
   wherein the generating is performed according to a chosen one of either: the first group of default settings and the first group of user settings, or the second group of default settings and the second group of user settings.

31. A system, comprising:
   a computer having a processor;
   a server application running on the computer and structured and arranged to: receive a definition of adjustable user settings from a user; receive input from the user after the receiving the definition of the adjustable user settings; retrieve data based on the input; generate a tabular display of the data according to default settings and the user settings of the user; and transmit the tabular display to the user; and
   a client application structured and arranged to display the tabular display,
   wherein:
   the default settings comprise a column name, a default display column order, a default sort column order, and a default sort order, and
   the user settings comprise a user display column order, a user sort column order, and a user sort order.

32. The system of claim 31, wherein the input is a database query.

33. The system of claim 31, wherein the user settings are adjustable using a graphical user interface (GUI) that is separate from a display window having the tabular display, and further comprising:
   receiving a request to adjust the user settings;
   as a result of the receiving the request, presenting the user with the GUI for editing the user settings;
   receiving data defining the user settings via the GUI; and
   storing the user settings in a file based on the received data;
   wherein the generating the tabular display is performed using the user settings stored in the file.

34. The system of claim 31, wherein the user settings override corresponding default settings.

35. The system of claim 31, wherein the user settings comprise:
   a first group of user settings that define a first configuration; and
   a second group of user settings that define a second configuration,
   wherein the generating is performed according to a chosen one of either the first group of user settings or the second group of user settings.

36. The system of claim 31, wherein:
   the user is one of a plurality of users, and
   each of the plurality of users shares the same default settings and has unique user settings.

37. The system of claim 31, wherein the client application comprises a browser.

38. The system of claim 31, wherein the default settings comprise:
   a first group of default settings that define a first configuration; and
   a second group of default settings that define a second configuration, wherein the generating is performed according to a chosen one of either the first group of default settings or the second group of default settings.

39. The system of claim 38, wherein the user settings comprise:
  a first group of user settings that correspond to the first group of default settings; and
  a second group of user settings that correspond to the second group of default settings,
  wherein the generating is performed according to a chosen one of either: the first group of default settings and the first group of user settings, or the second group of default settings and the second group of user settings.

40. A system comprising:
  a server having a processor and a database containing data associated with default settings and predefined adjustable user settings, wherein the default settings comprise a column name, a default display column order, a default sort column order, and a default sort order, and the user settings comprise a user display column order, a user sort column order, and a user sort order, and
  at least one of a hardware and a software component for receiving input from a user, retrieving data based upon the input, generating a tabular display, and transmitting the tabular display to the user,
  wherein the system generates the tabular display according to the default settings and the user settings;
  wherein the user settings are adjustable using a graphical user interface (GUI) that is separate from a display window having the tabular display;
  wherein the system is further configured to:
    receive a request to adjust the user settings;
    as a result of the receiving the request, present the user with the GUI for editing the user settings;
    receive data defining the user settings via the GUI, wherein the data includes the user display column order, the user sort column order, and the user sort order; and
    store the user settings based on the received data; and
  wherein the system is further configured to generate the tabular display using the stored user settings.

* * * * *